United States Patent
Abdeen

(10) Patent No.: US 9,150,429 B2
(45) Date of Patent: Oct. 6, 2015

(54) DESALINATION SYSTEM

(71) Applicant: UMM AL-QURA UNIVERSITY, Makkah (SA)

(72) Inventor: Adel Mohamed Abdelkader Abdel Dayem Abdeen, Makkah (SA)

(73) Assignee: UMM AL-QURA UNIVERSITY, Makkah (SA)

( * ) Notice: Subject to any disclaimer, the term of this patent is extended or adjusted under 35 U.S.C. 154(b) by 276 days.

(21) Appl. No.: 13/776,561

(22) Filed: Feb. 25, 2013

(65) Prior Publication Data

US 2014/0238839 A1     Aug. 28, 2014

(51) Int. Cl.
*C02F 1/06* (2006.01)
*C02F 1/14* (2006.01)
*C02F 103/08* (2006.01)
*B01D 1/14* (2006.01)
*B01D 3/06* (2006.01)
*B01D 1/16* (2006.01)
*B01D 5/00* (2006.01)
*B05B 7/16* (2006.01)
*C02F 1/12* (2006.01)

(52) U.S. Cl.
CPC ... *C02F 1/14* (2013.01); *B01D 1/14* (2013.01); *B01D 1/16* (2013.01); *B01D 3/06* (2013.01); *B01D 5/0036* (2013.01); *B05B 7/166* (2013.01); *B05B 7/1613* (2013.01); *C02F 1/12* (2013.01); *C02F 2103/08* (2013.01); *Y10S 203/17* (2013.01)

(58) Field of Classification Search
CPC .............. C02F 1/006; C02F 1/04; C02F 1/06; C02F 1/12; C02F 1/14; C02F 2103/08; C02F 2209/42; B01D 1/0035; B01D 1/0082; B01D 1/14; B01D 1/16; B01D 1/20; B01D 3/06; B01D 3/4211; B01D 3/4294; B01D 5/0003; B01D 5/003; B01D 5/0036; B01D 5/006; B05B 1/686; B05B 7/0483; B05B 7/16–7/1613; B05B 7/166; Y10S 159/903; Y10S 165/193; Y10S 165/911; Y10S 165/913; Y10S 203/01; Y10S 203/17

See application file for complete search history.

(56) References Cited

U.S. PATENT DOCUMENTS 3,206,379 A * 9/1965 Hill .................................. 203/10
3,355,364 A * 11/1967 Hammond .................... 202/172

(Continued)

FOREIGN PATENT DOCUMENTS

CN    201648163 U    11/2010
CN    101671056 B    1/2011

(Continued)

OTHER PUBLICATIONS

Jerome E. Johnson et al."The development of a solar thermal water purification, heating, and power generation system: A case study", Mar. 2009, pp. 1-26.*

*Primary Examiner* — Virginia Manoharan
(74) *Attorney, Agent, or Firm* — Richard C. Litman

(57) ABSTRACT

The solar, water desalination system includes a desalination chamber where fine water droplets are injected upward by an air atomizer towards an air-cooled condenser. Hot saline water is ejected vertically upward to double the contact time between the droplets and the surrounding air. The air is preheated by solar energy in parallel with an auxiliary heater to prevent lowering of the droplet temperature. Pumped air functions as a condensation media and to pull the salt water into the atomizer. This arrangement improves the heat and mass transfer inside the desalination chamber.

7 Claims, 7 Drawing Sheets

(56) References Cited

U.S. PATENT DOCUMENTS

| | | | |
|---|---|---|---|
| 3,408,262 A * | 10/1968 | Matye | 202/177 |
| 3,931,371 A * | 1/1976 | Maurer et al. | 261/116 |
| 4,664,752 A * | 5/1987 | Zievers et al. | 203/10 |
| 4,762,593 A * | 8/1988 | Youngner | 202/186 |
| 4,888,097 A * | 12/1989 | Palmer et al. | 203/1 |
| 5,053,110 A * | 10/1991 | Deutsch | 202/176 |
| 5,181,991 A * | 1/1993 | Deutsch | 202/176 |
| 6,165,326 A * | 12/2000 | Markopulos | 202/234 |
| 6,293,121 B1 * | 9/2001 | Labrador | 62/304 |
| 6,391,162 B1 * | 5/2002 | Kamiya et al. | 203/11 |
| 6,699,369 B1 * | 3/2004 | Hartman et al. | 203/11 |
| 6,919,000 B2 * | 7/2005 | Klausner et al. | 203/10 |
| 7,154,190 B2 * | 12/2006 | Kaploun | 290/43 |
| 8,365,463 B2 * | 2/2013 | Walsh, Jr. | 47/1.4 |
| 2004/0060808 A1 * | 4/2004 | LaViolette | 202/234 |
| 2006/0124440 A1 * | 6/2006 | Pautz et al. | 203/10 |
| 2011/0174605 A1 | 7/2011 | Ugolin | |
| 2011/0309162 A1 * | 12/2011 | Rock | 239/289 |

FOREIGN PATENT DOCUMENTS

| | | |
|---|---|---|
| CN | 102010020 A | 4/2011 |
| CN | 201932925 U | 8/2011 |
| DE | 29 22 348 A1 | 12/1980 |
| JP | 58-124583 | 7/1983 |

* cited by examiner

ND SYSTEM

DESALINATION SYSTEM

BACKGROUND OF THE INVENTION

1. Field of the Invention

The present invention relates to saline water processing systems, and particularly to a desalination system utilizing forced air for improved evaporation and condensation performance.

2. Description of the Related Art

Various methods are used for desalination of seawater. One of them is the evaporation/condensation (HD) process. In this method the salt water is evaporated and simultaneously condensed to produce desalinated water. The HD process is based on the fact that air can be mixed with significant quantities of vapor. The amount of vapor able to be carried by air increases with temperature. For example, 1 kg of dry air can carry about 0.5 kg of vapor and about 670 kcal when its temperature increases from 30° C. to 80° C. When the hot, dry air flows in contact with salt water, the air extracts a certain quantity of vapor, which simultaneously cools the hot air via heat transfer so that the air becomes humid. The desalinated water is recovered by maintaining humid air in contact with a cooling surface, causing condensation to occur with some of the vapor mixed with air. Generally, the condensation is carried out in another exchanger, where salt water is preheated by latent heat recovery. An external heat contribution is, thus, necessary to compensate for any heat loss.

Four parameters affect the evaporation process: (a) air pressure, (b) water temperature, (c) water-air contact surface area, and (d) contact time of water with the surrounding air. Evacuation of the desalination unit can improve the evaporation rate, but it is difficult to implement, requiring much consideration of the limitations.

Of course, high salt water temperature increases the water evaporation performance. However, salt scaling problems can limit the allowable temperatures used. Additionally, the temperatures at which a solar system can efficiently perform and the available waste heat must be taken into consideration.

Flashing-water contact surface area can be increased by either increasing flow rate or flashing the water into fine droplets. A limited decrease of the droplets' diameter improves evaporation through improved convective heat transfer at their surface. Moreover, use of forced air convection inside the desalination chamber may improve the evaporation rate. However, studies have shown that natural convection is more preferable, since forced-air convection does not show significant gain in the evaporation rate.

The contact time between the flashed water droplets and the surrounding air is based on the design of the desalination chamber. Heat convection can be improved if the contact time of droplets with the surrounding air is increased. This can be accomplished by increasing the length of the flashing path inside the desalination chamber. For example, conventional systems inject hot salt water vertically downward from the chamber roof. Therefore, the contact time depends on the chamber height, in this case.

For systems that use solar energy as a heat source, the solar collectors are used to heat the salt water. In most instances, the salt water can be directly heated inside the collector. Unfortunately, problems were found due to salt scaling inside the solar collectors. This is exemplary of an open-loop system. In a closed-loop system, the salt water is heated indirectly along a heat exchanger between the collector and desalination loops. One example of a closed-loop system includes a forced solar water heater. Another example utilizes vacuum pressure inside the chamber, which has been shown to greatly improve performance. Additionally, the cost of water production can be reduced using different materials, flow rates and temperatures.

In light of the above, there is still a need in the art of desalination systems to provide a more efficient and improved system and method of extracting desalinated water in current plants. Thus, a solar, water desalination system solving the aforementioned problems is desired.

SUMMARY OF THE INVENTION

The desalination system includes a desalination chamber where fine water droplets are injected by using an air atomizer to improve the evaporation rate. Hot saline water is ejected vertically upward to double the contact time between the droplets and the surrounding air. The air is preheated by solar energy in parallel with an auxiliary heater to prevent lowering of the droplet temperature. Pumped air functions as a condensation media and to pull the salt water into the atomizer. This arrangement improves the heat and mass transfer inside the desalination chamber.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
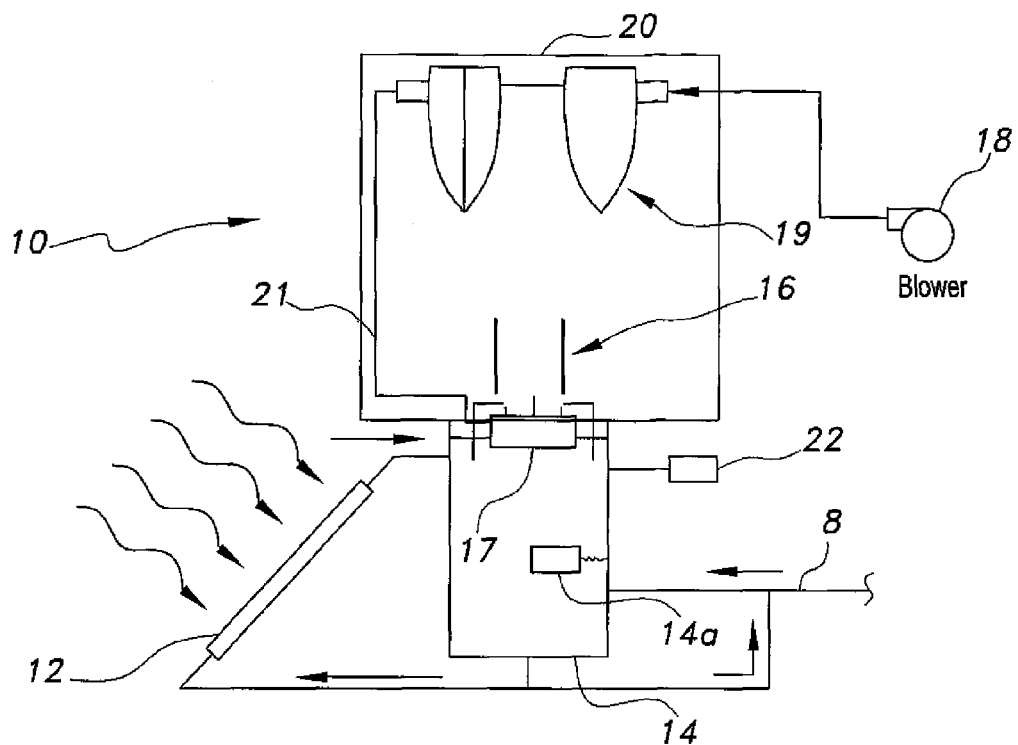
FIG. 1 is a diagrammatic side view of a desalination system according to the present invention.

The desalination system, generally referenced by the reference number 10 in the drawings, provides efficient and increased production of desalinated water. The desalination system 10 can also be referred to as "the system." Initially, the following tables set forth brief descriptions of the nomenclature and subscripts used in describing the invention.

TABLE 1

| | Nomenclature |
|---|---|
| A | Collector area, m² |
| A1-A6 | Variables of equation 23 |
| Ac | Desalination chamber surface area, m2 |
| AP | Annual payment of the total capital investment as a percent of the investment per year |
| $C_p$ | Specific heat of working fluid, kJ/kgK |
| D | Diameter, m |
| F | Friction factor |
| $F'U_L$ | Product of the collector efficiency factor, F', and heat loss coefficient, UL, W/m²C |
| $F_R U_L$ | Slope of the collector efficiency versus $(T_{ci} - T_a)$/IT curve, W/m²C |
| $F_R$ | Intercept efficiency corrected for non-normal incidence |
| g | Gravitational constant, m/s² |
| G | Collector flow rate per unit area, m² |
| $G_{test}$ | Collector flow rate per unit area at test conditions, kg/m² |
| $h_{fg}$ | The latent heat of the distilled water at its temperature, kJ/kg |
| $h_L$ | Pressure head, m |
| I | Total capital investment |
| I | Storage tank segment |
| $I_T$ | Total incident radiation per unit area, W/m² |
| K | Friction factor o the piping connections |
| $k_s$ | Thermal conductivity |
| l | Length, m |
| L | Annual operating man hours of hours of labor per year |
| $\dot{m}$ | Thermosiphon flow rate, kg/s |
| $\dot{m}_d$ | Distilled water mass flow rate, kg/s |
| $\dot{m}_h$ | Mass flow rate of hot stream entering tank, kg/s |
| $\dot{m}_L$ | Mass flow rate of load, kg/s |
| MR | Annual maintenance and repair (labor and materials) as percent of investment per year (≈1%) |
| N | Pay-out period (≈20 years) |
| $Q_{in}$ | Rate of energy input to tank from hot fluid stream, W |
| $Q_{sup}$ | Rate of energy supplied to load by tank, W |
| $Q_u$ | Rate of useful energy collection, W |
| r | Annual fraction inflation rate (=10% per year), |
| $r_c$ | Ratio of collector heat removal efficiency factor, $F_R$, to the value at test conditions |
| Re | Reynolds number for flow in pipes |
| S | Total cost (fixed and operating) of the saline water supply per m³ of product (≈0.03 US$/m³) |
| $T_a$ | Ambient temperature, ° C. |
| $T_c$ | Collector outlet temperature, ° C. |
| $T_{ci}$ | Collector inlet temperature, ° C. |
| $T_{ck}$ | Temperature of k$^{th}$ node in collector, ° C. |
| TD | Temperature of water delivered by tank to load, ° C. |
| $T_h$ | Temperature of hot fluid entering tank, ° C. |
| $T_i$ | Temperature of i$^{th}$ segment, ° C. |
| TI | Effective annual tax and insurance charges as a percent of investment per year (≈0.5%) |
| $T_l$ | Temperature of load stream entering tank, ° C. |
| $T_{pi}$ | Temperature of inlet fluid to pipe, ° C. |
| $T_{po}$ | Pipe outlet fluid temperature, ° C. |
| $T_R$ | Temperature of fluid returns to heat source, ° C. |
| $T_{saline}$ | Saline water temperature, ° C. |
| V | Volume flow rate, m³/s |
| $V_h$ | Volume of fluid entering tank from heat source over a time interval t, m³/s |
| $V_i$ | Volume of i$^{th}$ segment, m³ |
| $V_L$ | Volume of fluid entering tank from load over a time interval t, m³/s |
| $V_t$ | Tank volume, m³ |
| $U_c$ | Desalination chamber heat loss coefficient, W/m²C |
| $U_A$ | Overall UA value of tank, W/C |
| W | Wage of the operating labor per man hour |
| $Y_d$ | Annual yield of desalinated water, m³/year |
| α | Absorbance of the collector absorber |
| $h_i$ | Height of the i$^{th}$ node, m |
| $P_i$ | Change in pressure across the i$^{th}$ node, N/m² |
| $\rho_i$ | Density of i$^{th}$ node, kg/m³ |
| ρ | Density, kg/m³ |
| τ | Transmittance of the collector glass covers |

TABLE 2

| | Subscripts | | |
|---|---|---|---|
| A | Forced air | w | Flashing water |

Referring to FIG. 1, the system 10 includes a supply of saline water 8, a solar collector 12, an insulated hot water tank 14, an atomizer 16, an air distributor 17, a blower 18, an electrical heater and float, an air condenser 19, and connection pipes 21. Saline water flows through the solar collector 12 and is heated thereby. This solar-heated water is stored in the tank 14. An exemplary solar collector 12 can be a 2.35 m² flat-plate type, and the tank 14 can have a 100-liter capacity. It is noted that any size and shape for both of the above can be used, depending on the requirements of the user. The collector 12 facilitates at least a mass flow rate of about 212.63 kgm²/h and about 800 W/m² solar radiations. It has been found that the collector efficiency curve results in $F_R\tau\alpha$=0.5408 and $F_R U_L$=2.0929 W/m²C.

The air atomizer 16 is disposed on top of the tank 14. The air atomizer 16 ejects hot salt water vertically upward inside an insulated desalination chamber 20. The desalination chamber 20 may, e.g., have dimensions of 1×1×1 m³ and is fixed carefully above the tank opening. The air blower 18 supplies air to the atomizer 16 during air distribution. An exemplary air blower can be 0.4-kW centrifugal air blower, 380 volt, with about 65% efficiency. The air is passed through a condenser 19 for preheating before going to the atomizer 16. As schematically shown FIG. 1, the condenser 19 has a tapered shape and a tapered bottom where condensed, desalinated water can collect to be passed on outside the chamber 20. An aluminum channel may be used for processing the desalinated water.

The condenser 19 includes two containers, which are connected in series. In this example, each container has a capacity of about 0.0405 m$^3$. This arrangement permits water injection along a vertical center-line of the chamber 20 between the two containers. This results in a uniform distribution of evaporation inside the chamber 20. The use of two containers also increases the condensing surface area and improves the condensation variation. A strip can placed under the condenser 19 to prevent mixing of injected salt water with condensed distilled water.

The operation of the system 10 begins with preheating the saline water in the tank 14. A preferred temperature is maintained at about 70° C. by an auxiliary heater. This relatively low temperature has been found to avoid potential salt scaling, which can partially clog holes in the atomizer 16. As mentioned above, the condensed desalinated water collects under the sides of the condenser 19 through channels to outside of the system. The non-evaporated saline water naturally falls back down to the tank 14 by gravity. A float 14A can be provided in the tank 14 to regulate and maintain desired saline water levels therein, depending on the production rate of desalinated water.

The air distributor 17 can be constructed from stainless steel in the shape of a closed cylinder. An inlet, comprised of a tube, connects to the condenser 19 by a rubber hose. A plurality of outlets at the top of the distributor 17 ejects saline water vertically with the air from the blower 18. An additional plurality of tubes pull saline water from the tank 14, and these are fixed to the atomizer 16. The distributor 17 is mounted to the top of the tank 14 opening and partially immersed inside the saline water of the tank 14. As previously mentioned, the water level inside the tank 14 is maintained at a relatively constant level through the use of float 14A, as is known in the art.

With this construction, the desalination chamber 20 and the heat source of hot water are compacted in an integral, single structure. This substantially eliminates heat losses that are normally obtained during water passes. Additionally, heat loss is also minimized in return water passes. Although some of the hot air can ventilate from the chamber 20 through clearance between the chamber walls and the tank opening, which causes some heat loss, it still maintains improved heat and mass transfer inside the chamber 20.

In the instance where solely solar energy is used, it may heat the tank water by a few degrees. To raise the temperature to a more desired level, the tank water can be heated for a couple of days during sunny days prior to startup. Potentially, the temperature used for desalination is not high, but the system still works well without any additional heat.

In the instance where both solar energy and an auxiliary heat source are used in combination, the system can be provided with the auxiliary heat source 22 operatively connected to the tank 14. In this case, the auxiliary heat source 22 can be a two-kW electrical heater raising the tank temperature to desired levels, e.g., about 70° C. Preferably, the auxiliary heat source 22 is fixed inside the upper third of the tank 14 for maintaining relatively constant temperature during operation.

To monitor temperature variations inside the desalination chamber 20, k-type thermocouples can be disposed therein. These can be connected to a thermometer (type K). Additionally, moisture inside the chamber 20 can be measured by a thermo-hygrometer. The thermocouples should be calibrated and tested to estimate the correct measured temperatures. Moreover, the salinity of water is measured by a salinity meter, preferably having a resolution of about 0.01. Pressure can be measured by a Bourdon-type gauge, and a flow meter is used to measure the air flow rate. Moreover, a thermometer is used to measure the exit and inlet temperatures of the water and air.

With reference to FIG. 1, operation of the system 10 follows. The blower 18 delivers fresh air to the condenser 19 to be preheated. The preheated air flows to the air distributor 17 in order to force hot, saline water through the atomizer 16. The water is flashed by the air inside the desalination chamber 20 through the atomizer 16. The atomizer 16 preferably includes a plurality of air nozzles, each nozzle having a diameter of about 3 mm and a connected pipe having a diameter of about 4 mm. The atomizer 16 humidifies the air inside the desalination chamber 20. Due to density difference, humid air moves up towards the cold surface of the condenser 19, where desalinated water condenses on the condenser surfaces. This desalinated water is later collected outside the chamber 20. The remaining saline water in this evaporation process returns to the tank 14 via gravity as shown by the return arrows in supply line 8.

The following describes a mathematical model of the system 10 which incorporates thermosiphoning of solar energy. Flow in the cycle loop is assumed to be steady-state. The system 10 has been analyzed by dividing the thermosiphon loop into a number of segments normal to the flow direction and applying Bernoulli's equation for incompressible flow to each segment. The flow rate is obtained by numerical solution of the resulting set of equations.

Application of Bernoulli's equation to any node, i, in the thermosiphon loop results in the following expression for pressure drop:

$$\Delta P_{i} = p_i \cdot g \cdot \Delta h_i + p_i \cdot g \cdot h_{Li}. \tag{1}$$

The thermosiphon model involves the numerical solution for the flow rate that satisfies the above equation. The density of the fluid is evaluated at the local temperature using a correlation for water. Temperatures and frictional head losses in each node of the collector and pipes are determined as described below. The collector inlet and outlet pipes are each considered to be single nodes, with negligible thermal capacitance.

A first law analysis yields the following expressions for average and outlet temperatures of these pipes:

$$T_{po} = T_a + (T_{pi} - T_a)\exp\left[-\frac{(UA)_p}{mC_p}\right]. \tag{2}$$

Frictional head loss in either pipe is given as:

$$H_p = \frac{f \cdot l \cdot v^2}{2d} + \frac{Kv^2}{2}, \tag{3}$$

where K is the friction factor for the piping connections and the friction factor, f, is:
f=64/Re for Re<2000
f=0.32 for Re>2000.

By this way the pressure drop can be estimated through the pipes and collector risers and headers where the friction head loss in the tank is neglected.

The net weight of fluid in the collector is found by dividing the collector into Nx equally sized nodes. The thermal performance is modeled according to the Hottel-Whillier equation. The temperature at the midpoint of any collector node, k, is:

$$T_{ck} = T_a + \frac{I_T F_R(\tau\alpha)}{F_R U_L} + \left(-T_a - \frac{I_T F_R(\tau\alpha)}{F_R U_L}\right) \cdot \exp\left[\frac{F'U_L}{G \cdot C_P} \cdot \frac{\left(k - \frac{1}{2}\right)}{N_X}\right] \quad (4)$$

The collector parameter $F'U_L$ is calculated from the value of $F_R U_L$ and G at test conditions:

$$F'U_L = -G_{test} \ln\left(1 - \frac{F_R U_L}{G_{test} C_P}\right). \quad (5)$$

The overall useful energy collection is:

$$Q_u = r_c A(F_R(\tau\alpha)I_T - F_R U_L(T_{ci} - T_a)), \quad (6)$$

where $$r_c = \frac{F_R | \text{use}}{F_R | \text{test}} = \frac{G\left(1 - \exp\left(-\frac{F'U_L}{GC_P}\right)\right)}{G_{test}\left(1 - \exp\left(-\frac{F'U_L}{G_{test} C_P}\right)\right)}. \quad (7)$$

The tank 14 has been initially divided into four segments of volume $V_i$ and temperature $T_i$, so that no temperature inversions are present. In one time period, the heat source delivers a volume of liquid, $V_h$, equal to $\dot{m}_h \Delta t/\rho$ at a temperature $T_h$. Assuming $T_h$ is greater than $T_1$ (first segment temperature), then a new segment is added at the top of the tank and the existing profile is shifted. At the same time, the fluid enters from the load with a volume, $V_L$, equal to $\dot{m}_h \Delta t/\rho$ and temperature of $T_L$. If $T_L$ is less than $T_4$ (fourth segment temperature), then a segment is added at the bottom of the tank and the profile is shifted once more. The net shift of the profile in the tank is equal to the difference between the total heat source volume and load volume or $(\dot{m}_h - \dot{m}_L)\Delta t/\rho$. The average temperature delivered to load is:

$$T_D = \frac{V_h T_h + (V_L - V_h)T_1}{V_L}. \quad (8)$$

Storage losses from the tank and conduction between segments are evaluated before the temperature profile has been adjusted for flows. This is accomplished by solving the following differential equation for each segment:

$$\rho C_P V_i \frac{dT_i}{dt} = \quad (9)$$
$$-(UA)_i(T_i - T_{env}) + (k_s A)_{i-1}\frac{(T_{i-1} - T_i)}{\Delta h_{i-1}} - (k_s A)_i \frac{(T_i - T_{i+1})}{\Delta h_{i+1}},$$

where $\Delta h_{i-1}$=separation between centers of segments i−1 and i, and $\Delta h_{i+1}$=separation between centers of segments i and i+1.

The energy input to the tank 14 due to the hot inlet stream is:

$$Q_{in} = m_h C_P(T_h - T_R). \quad (10)$$

The energy supplied to the load is:

$$Q_{sup} = m_L C_P(T_D - T_L). \quad (10)$$

Figure 2:
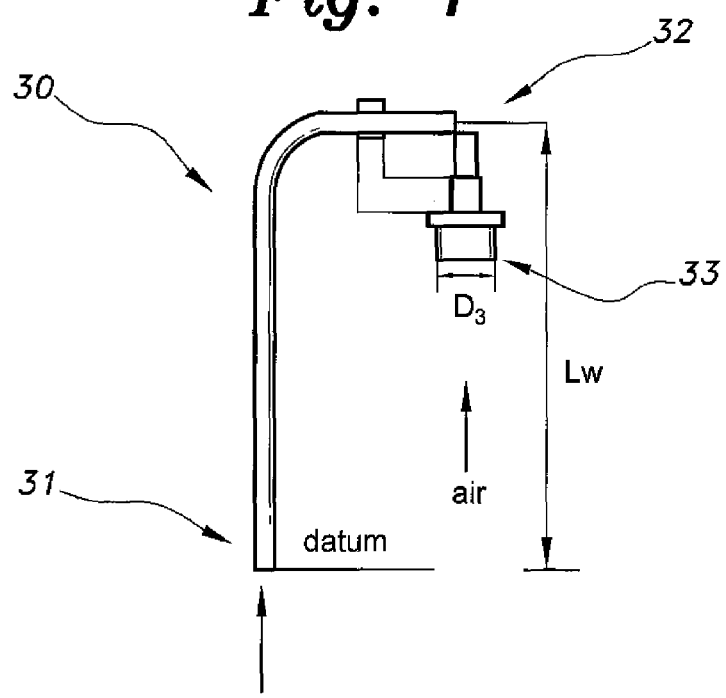
FIG. 2 is a schematic diagram of an atomizer and air distributor in a desalination system according to the present invention.

A schematic diagram of a nozzle arrangement 30 is depicted in FIG. 2. To simulate the desalination chamber 20, the atomized water flow rate is required. To estimate it, the Bernoulli equation for incompressible flow is applied between the points 31 and 32 and between points 33 and 32, as shown in FIG. 2. First the air flow rate ($\dot{V}_a$) can be estimated from the blower power as:

$$\dot{V}_a = \frac{P_f \eta_f}{(g * H_a * \rho_a)}. \quad (12)$$

Applying Bernoulli equation between the points 31 and 32 for water flow gets:

$$h_{Lw} = \left[\frac{f_w \cdot l_w}{D_2} + 1.2\right] \frac{8\dot{V}_w^2}{\pi^2 g D_2^4}. \quad (13)$$

Similarly applying Bernoulli equation between the points 3 and 2 for water flow gets $$h_{La} = \left[\frac{f_a \cdot l_a}{D_3} + 1.2\right] \frac{8\dot{V}_a^2}{\pi^2 g D_3^4} \quad (14)$$

where $$h_L = \frac{0.2}{g\rho_a}. \quad (15)$$

So the atomized water flow rate can be determined as:

$$\dot{V}_w = 4\sqrt{\left[\frac{-h_L + h_{La} * \dot{V}_a^2}{h_{LW}}\right]} \quad (16)$$

To estimate the distilled mass flow rate, an energy balance is applied for the desalination chamber 20. Since the input energy to the chamber (input atomized water and air, and inlet air) equals the output energy (output desalinated water, saline water and outlet air), the following equations are developed:

$$A1 = C_p\left(T_d - \frac{T_a}{2} - \frac{T_D}{2}\right) \quad (17)$$

$$A2 = \rho_W \dot{V}_W C_P T_D \quad (18)$$

$$A3 = \rho_a \dot{V}_a C_{Pa} T_a \quad (19)$$

$$A4 = \rho_a \dot{V}_a C_{Pa}(T_a + T_D)/2 \quad (20)$$

$$A5 = U_c A_c\left[\frac{(T_a + T_D)}{2} - T_a\right] \quad (21)$$

$$A6 = \rho_W \dot{V}_W C_P(T_a + T_D)/2 \quad (22)$$

$$m_d = (A2 + A3 - A4 - A5 - A6)/A1. \quad (23)$$

Assume that the desalinated outlet water temperature, $T_d = T_D - 8$ and the saline water outlet temperature, $$T_{saline} = (T_a + T_D)/2 \text{ and } T_{ao} = \left[\frac{m_d h_f g}{\rho_a \dot{V}_a C_{Pa}}\right] + T_a.$$

The above twenty three equations are solved simultaneously together for each time step to estimate the different variables considered under the measured weather data of the locale. In this instance, the locale is Cairo city.

The following describes the results of the above analysis. In the system 10 where constant temperature was maintained, the auxiliary heater 20 is used to heat saline water in the tank 14 up to a predefined temperature. This condition was used to analyze performance of the system 10 under relatively constant conditions. The performance of the desalination system 10 is evaluated by the quantity of the desalinated water produced. The measured data is observed as follows.

At the start, fresh air temperature entering the condenser 19 is about 30° C. During operation, the exiting air from the condenser 19 reached 55° C. (at steady state) from 50° C. (at warm up) with a regular volume flow rate of about 0.085 m3/s. The air pressure at the distributor 17 is about 1.2 bar. Hot water feeding the atomizer 16 is about 70° C. The temperature of the exiting desalinated water is about 30° C. Relative humidity (RH) in the side of the condenser enclosure is measured between 18% (at warm up) to 30% (at steady state), and in the side of the humidifier enclosure; it ranges between 60 to 80%. After about fifteen minutes of operation, the flashing water condensed and collected in the channel. This delay can be considered as the warm up period of the desalination system 10. It has been found that about 1.5 liters of desalinated water was collected each hour. The system 10 can produce at least about 36 liter/day during continuous daily operation.

Figure 3:
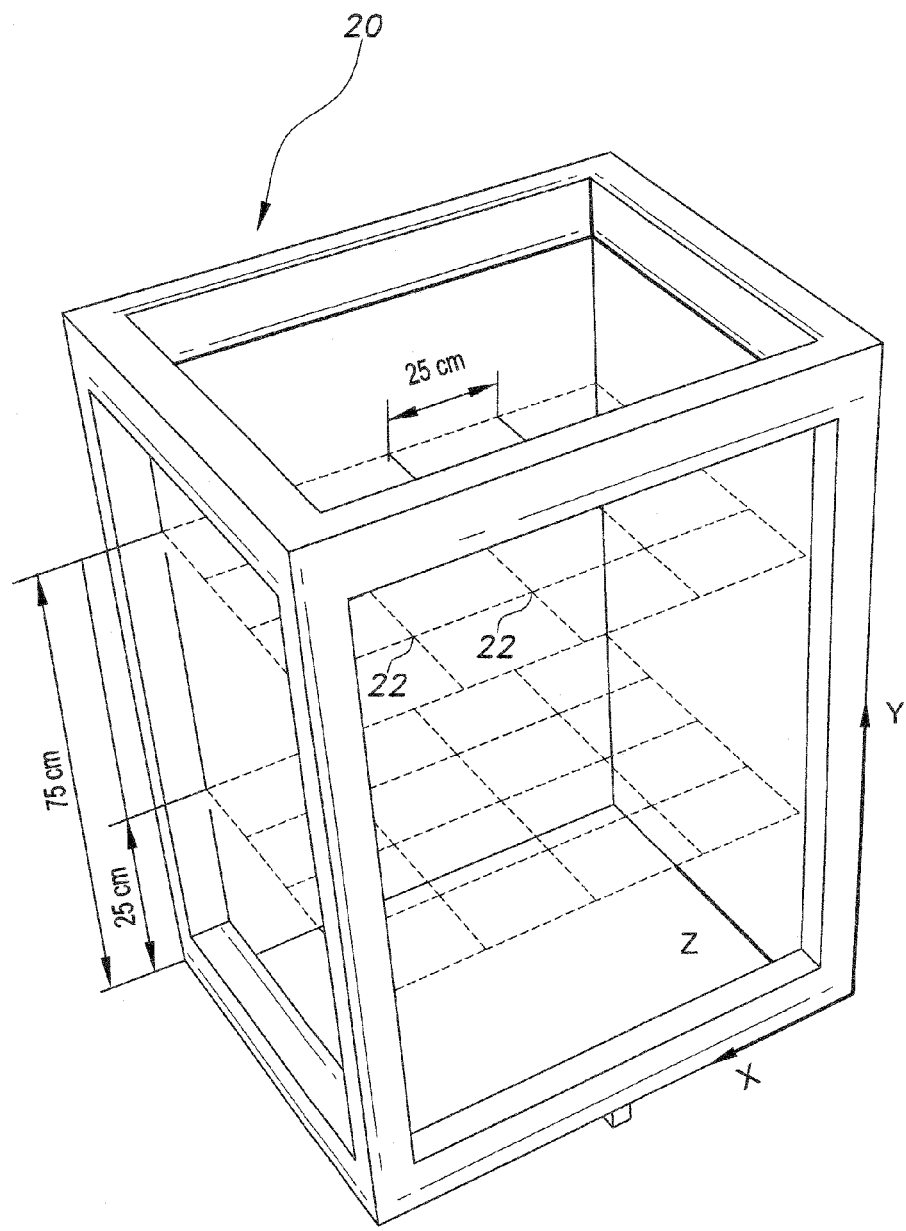
FIG. 3 is a perspective view of a desalination chamber in a desalination system according to the present invention, showing measurement locations.
Figure 4:
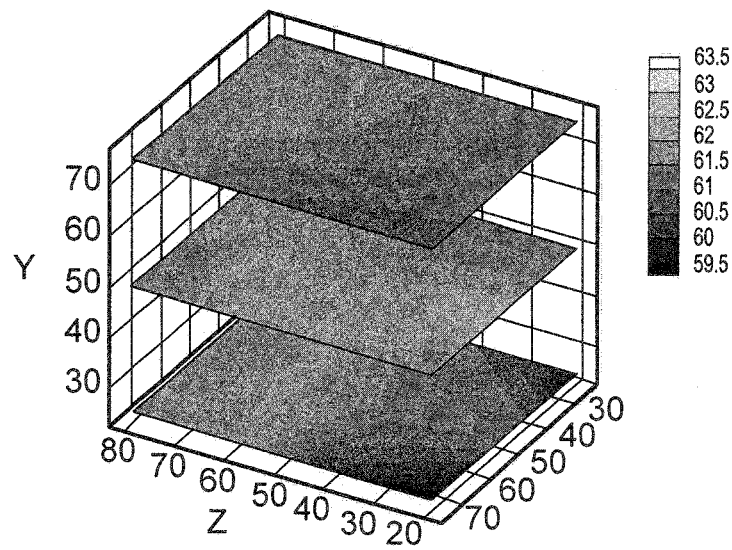
FIG. 4 is spectrograph of temperature distribution inside a desalination chamber of a desalination system according to the present invention, showing constant heating temperature.

The temperature distribution inside the desalination chamber 20 was obtained by measuring the temperatures at different locations inside, as exemplarily shown in FIG. 3. By these points (exemplarily indicated by the intersections of the hidden grid lines), the chamber 20 was divided into forty-eight parts. Then, twenty-seven locations are distributed regularly along the length of the desalination chamber 20 to visualize the temperature and relative humidity variation. The temperatures were measured simultaneously at two levels, at distances of 25 cm and at 75 cm from the chamber floor. In each location, a thermocouple is fixed to measure the temperature. This measured temperature distribution is shown in FIG. 4. Little difference has been found between different locations, which indicates that a good temperature distribution exists in the chamber 20. Maximum temperatures are obtained along the center-line region, and this is acceptable from a heat transfer point of view. As shown in FIG. 4, the temperature variation at the same plane is not homogeneous due to inhomogeneous heat losses within the desalination chamber 20. In addition, the room enclosure surrounding the second condenser part in series from the air inlet is little heated due to warm air incoming from the first in series.

Figure 5:
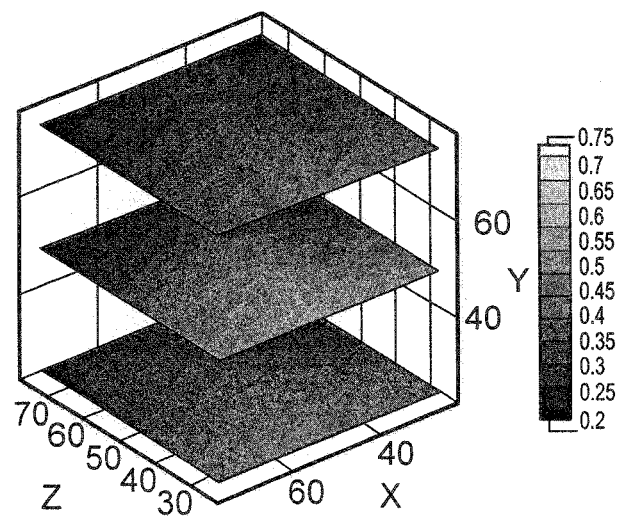
FIG. 5 is a spectrograph of the relative humidity distribution inside a desalination chamber in a desalination system according to the present invention.
Figure 6:
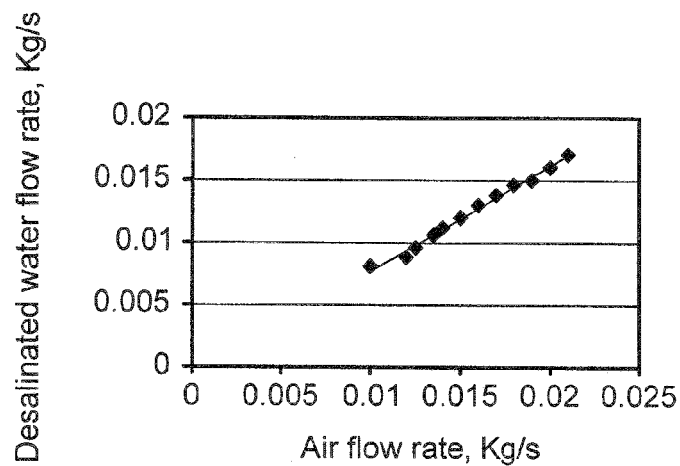
FIG. 6 is a graph showing the relationship between the desalinated water production versus air flow rate in a desalination system according to the present invention.

To evaluate performance of the condenser 19 and the evaporator, the temperature was measured for each side (an average value). A lower value of temperature of the condenser side indicates that the condenser surfaces are large enough to condense all of evaporated steam. That can be seen in the form of low measured humidity, as shown in FIG. 5. Therefore, the flow rate of the evaporated hot water could be raised. That is clearly presented in FIG. 6, in which the high air flow rate linearly increases the quantity of desalinated water being produced.

As expected, the enclosure that surrounds the condenser 19 has the minimum relative humidity. The vapor is condensed on the condenser surfaces. In the far regions, the vapor is increased causing higher relative humidity. It exchanges the mass and heat with the near regions of condenser 19, naturally. As shown in FIG. 5, the maximum relative humidity is about 80%, but it is yet to be saturated. Therefore, this forced heat and mass transfer inside the desalination chamber 20 has been deemed successfully provided. Additionally, the quantity of distilled water is relatively constant after the warming up process of about fifteen minutes.

Moreover, the increasing water flow rate increases the heat and mass transfer coefficients, as well as the solar collector efficiency. At the same time, it lowers the operating water temperature in the unit, and hence lowers the evaporation and condensation rate. The optimum flow rate is significantly affected by the desalination unit size, evaporative area and condenser surface area. As presented in FIG. 6, a linear relation between the air flow rate and the quantity of distilled water produced by the system 10 is found. In view of this relationship, an optimum flow rate could be determined based on a study of the economics.

Accordingly, this also indicates that the mass of the system 10 is a factor that can adversely affect performance. For example, the delay of fifteen minutes was recorded before the steady production of fresh water. Logically, most of the heat energy received in these early minutes was used to warm the relatively large mass of the system 10, which is about 150 kg. This lag time can be reduced by using lighter materials than galvanized steel for construction.

The influence of feeding hot water on unit productivity with natural air circulation shows that increasing the temperature of the feed water increases productivity, while the ambient temperature has a negligible effect on the total productivity. However, increasing the evaporating salt water may raise the possibility of scales concentration.

In FIG. 5, the relative humidity distribution inside the desalination chamber is presented. It is drawn as contours in three levels along the chamber height. The chamber door is located at the plane of Z=0. As described in the figure, the middle level has the highest humid air. That can be expected because that level is located far from the condenser and atomizer. Moreover, the moist area of this level (about 75%) is located in the side that has the air inlet to the chamber, which is colder than the other sides.

The other two levels have the same variation of relative humidity with higher values. The variation is regular around the regular shape condenser from right to left of FIG. 5. Also the relative humidity is linearly varied from front to back of the chamber. That is due to the regular rise in the air temperature inside the condenser.

Figure 7:
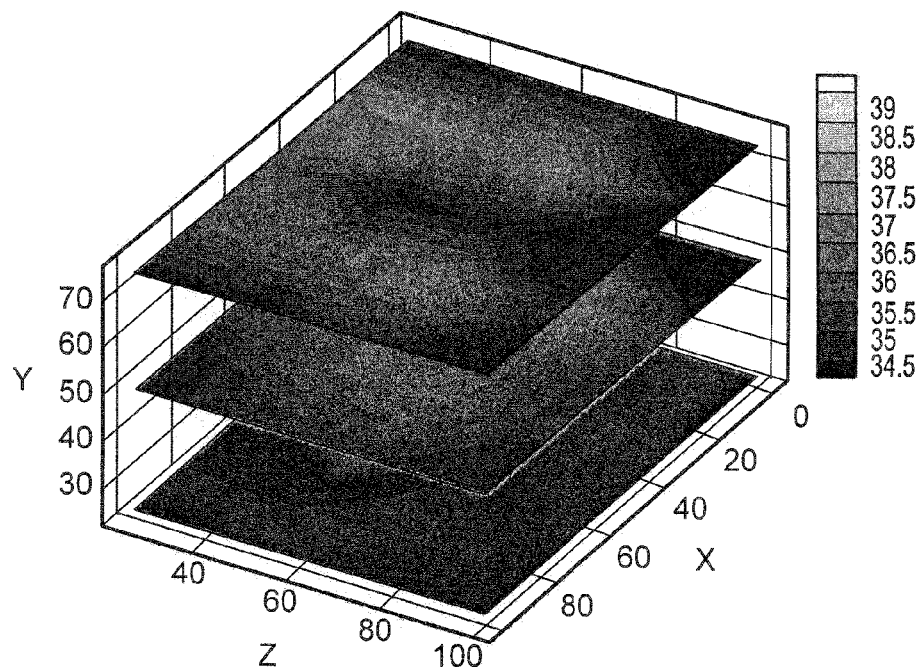
FIG. 7 is a spectrograph showing the temperature distribution inside a desalination chamber of a desalination system according to the present invention for heating only by solar energy.

In the system 10, when solar energy is used as the sole heat source, lower temperatures are obtained, as presented in FIG. 7. Lower temperatures than the first case are obtained due to the lower heating temperature. That is seen in lower productivity in that case, and is clearly affected by the condenser location. The temperature distribution inside the chamber is slightly changed from the first case. That can be understood as a result of using a lower temperature of evaporation. The temperatures normally change from time to time, based on the incident solar radiation and the ambient temperature. As expected, the upper plane of temperature locations has the highest temperatures. The significant effect of using the air condenser is clearly presented in the form of air temperature along the chamber, where the temperature is low in the inlet air side, but rises in the exit side. That affects the condensation process, which increases in the cold side, while it decreases in the hot one.

Figure 8:
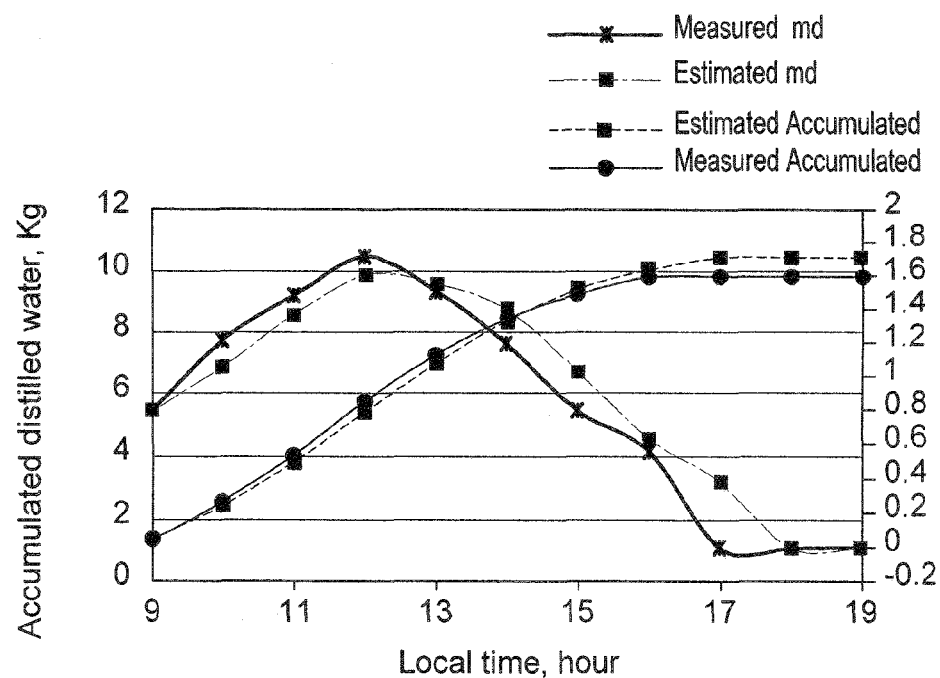
FIG. 8 is a graph showing the comparison between simulated and measured desalinated water production in a desalination system according to the present invention.

Accordingly, the upper level has the higher temperatures, while the lower level has the lower ones. Moreover, it is found that the system in that case can produce about ten liters of desalinate water at daytime, as shown in FIG. 8. That quantity depends basically on the used solar collector efficiency, which is relatively low in this work. If an efficient collector is used, the system output can be improved. Concerning the quality of water, it has been noticed that in comparison with other desalination systems functioning with extraction of non-condensable gases, the desalinated water produced in the HD installations is saturated with oxygen. In this case, it is sufficient to add active carbon and dolomite to improve the taste.

Figure 9:
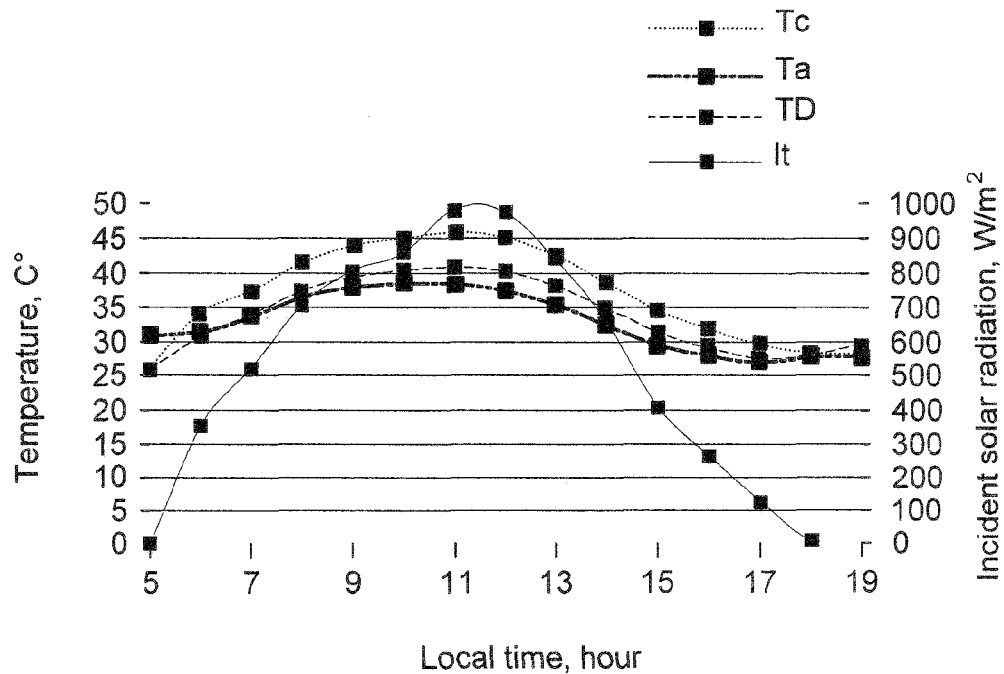
FIG. 9 is a graph showing the temperature and incident solar radiation on the day of comparison.

A numerical simulation and annual performance of the system has been conducted using the same specifications, geometry and dimensions of the system 10 described above. To validate the numerical simulation, the developed program was run using the same weather conditions of the experimental data that are shown in FIG. 9. As indicated in FIG. 8 the hourly produced distilled water is compared for the simulated and measured values. The daily accumulation of the distilled water is also indicated for the simulation and experimental conditions. The estimated hourly variation of the distilled water is in close agreement with the measured variation. The difference between them is about 10%. That difference is due to some factors not considered in the numerical simulation. Those factors are (a) the heat stored in the system materials, (b) the transmittance variation of the collector glass, (c) the atomized water temperature that was considered as the average temperature, (d) the outlet air and distilled water temperature were taken as average values, and (e) the assumptions those were considered for the energy equation to estimate the atomized water quantity.

In general, the difference in the hourly variation between the estimated and measured values makes no significant difference in the accumulated values, and the validation can be accepted. On the other hand the hourly variation in the collector outlet temperature ($T_c$) and load temperature ($T_L$) to the atomizer are shown in FIG. 9. This variation is similar to the solar radiation variation, as expected. Perhaps the temperatures are not high due to utilizing the hot water from the tank continually, although the ambient temperature is not low.

Figure 10:
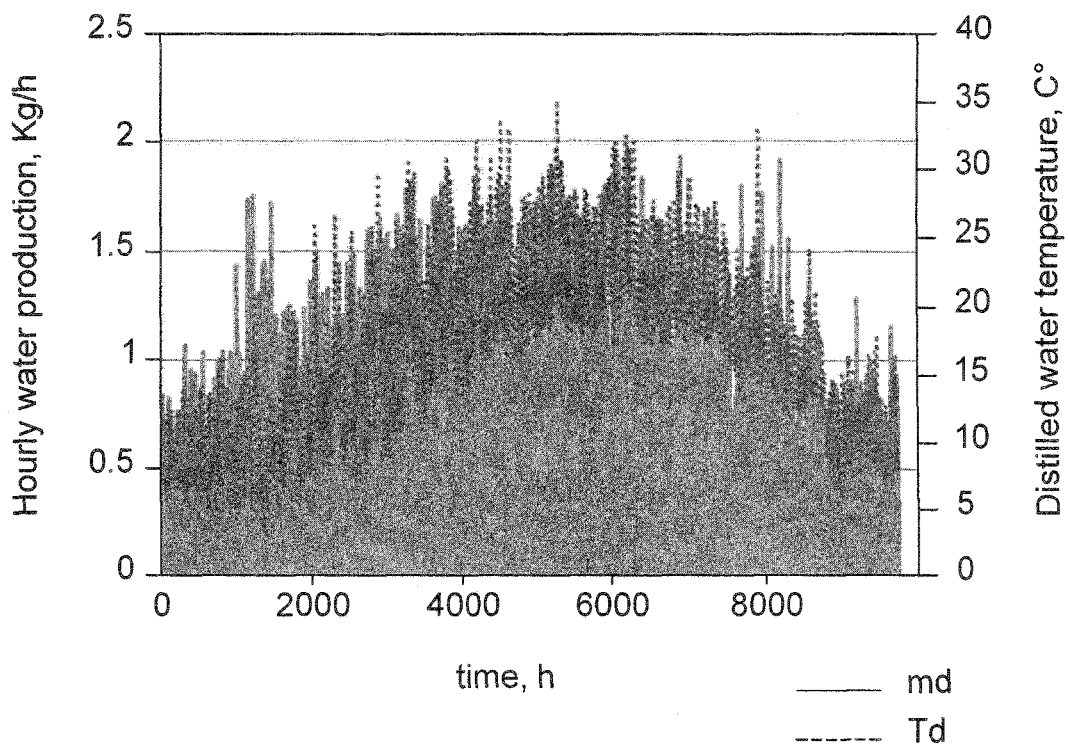
FIG. 10 is a graph showing annual variations of desalinated water production and temperature.

The annual variation of the distilled water produced by the system 10 is presented in FIG. 10. It shows the hourly values during the year. As expected, the quantity of desalinated water is maximized during the summer season and is minimized during the winter months. The annual variation of the desalinated water is very close to the annual variation of the solar radiation and ambient temperature. The ambient temperature has not higher effect on the system performance. The water production ranges from about 0.5 kg/h to about 1.8 kg/h. The annual production of the system is about 2,833 liters. The figure presents also the temperature variation of the distilled water. It is similar to the water production variation. Perhaps the temperature is relatively high (about 28° C.) in the summer, but it can be accepted relative to the ambient temperature in that period of time.

Figure 11:
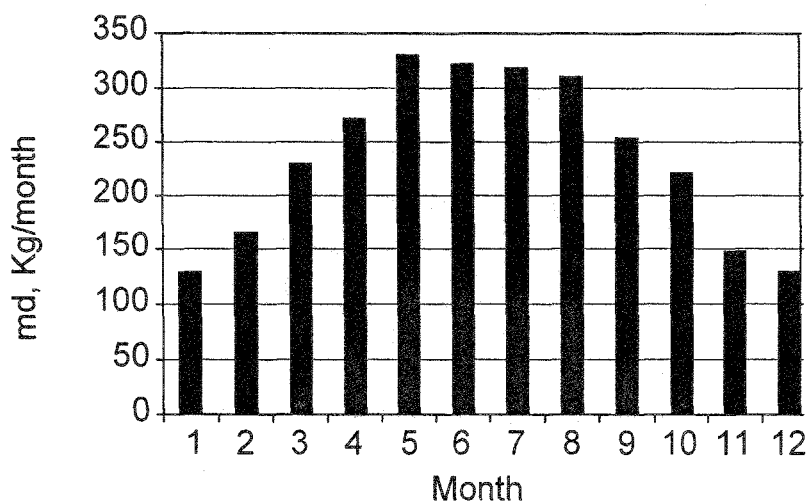
FIG. 11 is a chart showing estimated average monthly production of desalinated water according to the present invention.

The monthly average quantity of the distilled water is estimated in FIG. 11. The months of May to August have the highest production during the year, whereas December and January have the lowest values, as expected. The average yearly values can be found during the months March, April, October and November.

The system efficiency is estimated annually under the weather conditions of Cairo °N. The system efficiency is defined as:

$$\eta = \frac{m_d h_f g}{I_T \cdot A}. \tag{24}$$

Figure 12:
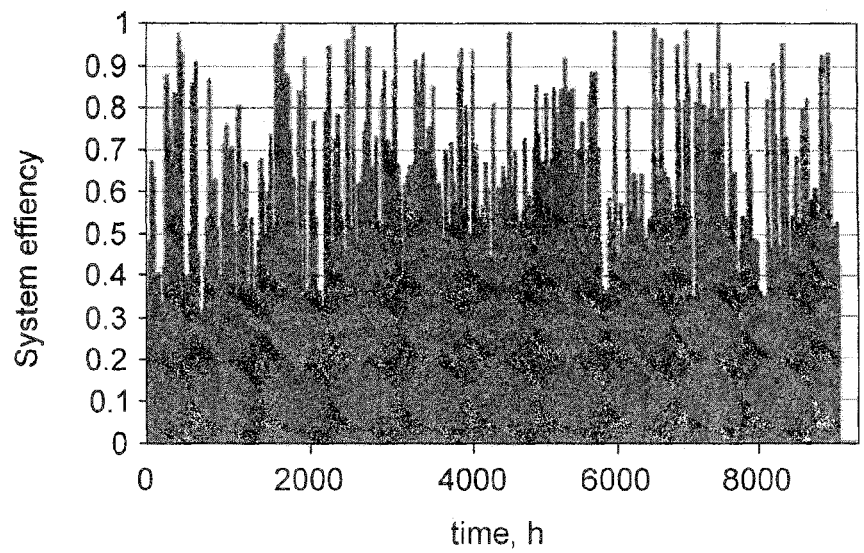
FIG. 12 is a graph showing annual variation of system efficiency according to the present invention.

In FIG. 12, the annual variation of the system efficiency is presented. The system efficiency is changed from day to day, depending on the input solar radiation and ambient temperature. Therefore, it has no defined trend during the year, and it has no seasonal performance. Its average value is not widely improved during the summer months due to higher ambient temperature. That can be understood because the ambient temperature has no higher significance on the system performance.

Figure 13:
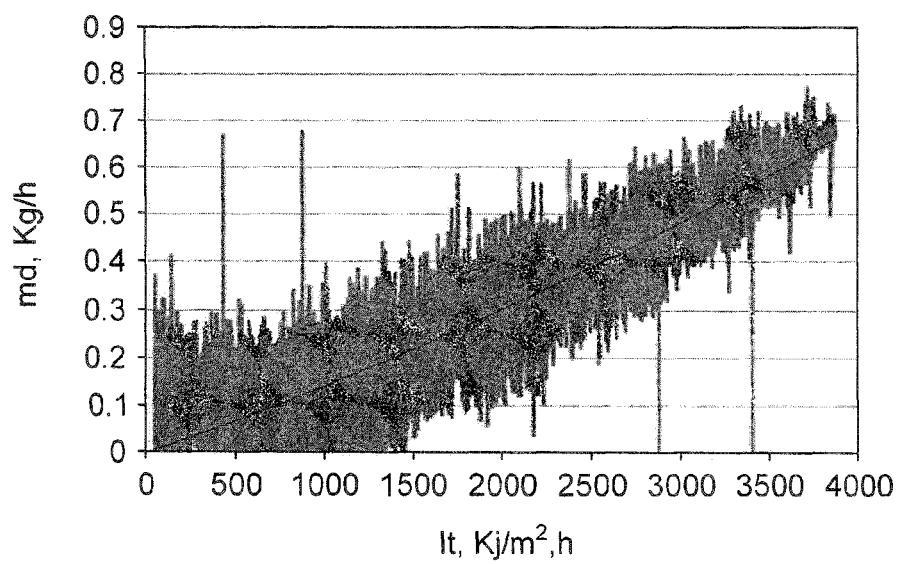
FIG. 13 is a graph comparing desalinated water production in relation to incident solar radiation according to the present invention.

In FIG. 13, the distilled water mass flow rate (kg/h) is estimated versus the total incident solar radiation (kJ/m2·h) on the collector during a year. The data is fitted as a second order equation with about 27% error. From that equation, $\dot{m}_d$ can be determined for any input value of solar radiation. The equation is obtained as:

$$m_d = 10^{-8} I_T^2 + 0.0001 I_T. \tag{25}$$

With the above evaluations, the cost of water production per cubic meter of desalinate, C, can be estimated by the following:

$$C = \frac{I(AP + MR + TI) + LW}{Yd} + S, \tag{26}$$

where $$AP = r\left[1 + \frac{1}{(1+r)^n - 1}\right]. \tag{27}$$

The initial (capital) cost of the system is about US$ 500. If the annual operating man hours is 500 hours at a wage of $5/hr and the average annual productivity of about 13 m³, then the estimated liter cost of the desalinated water is about 0.2 US$/liter. This may be higher than that produced by conventional energy, but it is acceptable where conventional energy is not readily available.

As a result of the above, the system 10 provides a more efficient humidification-dehumidification solar desalination system. The system 10 can work by either solar energy or auxiliary heater, or both. A natural-circulation solar water heater is used as a heat source. Forced air is used as a condenser fluid, and later on it is used as an atomizer of hot saline water. The system can work continuously, and the daily production of the distilled water is about 36 liters/day. That corresponds to about 0.37 liter for each kilowatt-hour of input energy. When the system 10 uses solar energy only, it can produce about 5 liters/day. That can be acceptable in light of conventional systems. With the validated numerical simulation of the system 10, the predicted results are in close alignment to the measured ones. The system performance was presented annually and monthly, and an empirical equation of the produced distilled water was obtained. The price of clean water can cost about 0.2 US$/liter. From the system evaluations, it has been found that using the described forced air system increases water atomization, resulting in increased condensation.

I claim:

1. A desalination system, comprising:
a supply of saline water
a solar heat source for heating saline water passing through the solar heat source;
an insulated tank connected to the solar heat source, the tank having a capacity sufficient for holding the heated saline water therein at a predetermined water level, the tank having a top;
an air distributor mounted at the top of the tank below the predetermined water level;
an air atomizer connected to the air distributor, the atomizer having at least one nozzle oriented for directing a spray of heated saline water vertically upward, thereby flashing the heated saline water;
a desalination chamber mounted on top of the tank, the desalination chamber enclosing the air distributor and the air atomizer, the desalination chamber having a top portion;
an air-cooled condenser disposed at the top portion inside the condenser;
an air blower connected to the condenser, the air blower forcing ambient air towards the condenser to be preheated thereby, and simultaneously facilitating condensation of water vapor from the spray of heated saline water, thereby desalinating the water and producing distilled water on the condenser; and
connecting pipes directing air between the blower and the condenser and between the condenser and the distributor;
wherein air flowing through the distributor forces the heated saline water through the atomizer to thereby flash the heated saline water vertically upward towards the condenser in order to extend evaporation and condensation exposure time and increase production of desalinated, distilled water.

2. The desalination system according to claim 1, further comprising an auxiliary heat source coupled to the tank, the auxiliary heat source assisting in maintaining the heated saline water at a predetermined, elevated temperature.

3. The desalination system according to claim 1, wherein the condenser comprises a pair of condenser units mounted in series.

4. The desalination system according to claim 3, wherein the pair of condenser units each comprises a tapered bottom for collecting desalinated water condensation for further processing.

5. The solar, water desalination system according to claim 1, further comprising means for maintaining the predetermined water level.

6. The solar, water desalination system according to claim 5, wherein the means for maintaining the predetermined water level comprises a float.

7. A process for producing desalinated water comprising the steps of:
providing a solar, water desalination system comprising;
a supply of saline water
a supply of saline water;
a solar heat source, the solar heat source heating saline water passing through the solar heat source;
an insulated tank for holding the heated saline water therein at a predetermined water level, the tank having a top;
an air distributor mounted at the top of the tank below the predetermined water level;
an air atomizer connected to the air distributor, the atomizer having at least one nozzle for directing heated saline water vertically upward thereby flashing the heated saline water;
a condenser chamber mounted on top of the tank, the condenser chamber enclosing the air distributor and the air atomizer, the condenser chamber having a condenser disposed at a top portion inside the condenser chamber;
an air blower connected to the condenser, the air blower forcing ambient air towards the condenser chamber to be preheated thereby and simultaneously facilitating condensation of desalinated water on the condenser chamber; and
connecting pipes directing air between the blower and the condenser chamber and between the condenser chamber and the distributor;
forcing air through the condenser chamber with the air blower to be preheated thereby;
directing the preheated air from the condenser chamber through the distributor;
flashing the heated saline water through the atomizer by the preheated air passing through the distributor; and
directing the flashing heated saline water vertically upward towards the condenser chamber thereby extending evaporation and condensation exposure for increased desalinated water production.

* * * * *